(12) United States Patent
Arnoldi et al.

(10) Patent No.: US 9,712,002 B2
(45) Date of Patent: Jul. 18, 2017

(54) INTERLOCKED STATOR YOKE AND STAR FOR ELECTRIC MOTOR

(71) Applicant: MAGNA ELECTRONICS INC., Auburn Hills, MI (US)

(72) Inventors: Ernesto G. Arnoldi, Luserna S. Giovanni (IT); Paolo L. Maurino, Bagnolo Piemonte (IT); Maurizio Avidano, Candiolo (IT)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 210 days.

(21) Appl. No.: 14/466,099

(22) Filed: Aug. 22, 2014

(65) Prior Publication Data

US 2015/0054378 A1 Feb. 26, 2015

Related U.S. Application Data

(60) Provisional application No. 61/869,195, filed on Aug. 23, 2013.

(51) Int. Cl.
*H02K 1/18* (2006.01)
*H02K 1/12* (2006.01)
(Continued)

(52) U.S. Cl.
CPC ............... *H02K 1/18* (2013.01); *H02K 1/12* (2013.01); *H02K 1/148* (2013.01); *H02K 15/02* (2013.01);
(Continued)

(58) Field of Classification Search
CPC H02K 1/14; H02K 1/148; H02K 1/16; H02K 1/12; H02K 1/185; H02K 15/02;
(Continued)

(56) References Cited

U.S. PATENT DOCUMENTS 1,538,196 A * 5/1925 Livingston ............... H02K 1/16
310/216.016
5,744,921 A 4/1998 Makaran
(Continued)

FOREIGN PATENT DOCUMENTS

DE 10352508 6/2005
DE 102007059380 5/2009
(Continued)

OTHER PUBLICATIONS

Yamagishi Toshiyuki; Aoki Kenichi; Oka Takenori; Iwakiri Mitsuru, Dynamo-Electric Machine, Kabushiki Kaisha Yaskawa Denki, WO 2014020756, Mar. 8, 2012.*
(Continued)

*Primary Examiner* — Burton Mullins
*Assistant Examiner* — Alexander Singh
(74) *Attorney, Agent, or Firm* — Gardner, Linn, Burkhart & Flory, LLP (57) ABSTRACT

A stator for an electric motor includes a yoke and a star disposed in the yoke. The star is configured to receive a rotor therein and has at least one wire coiled thereat. The yoke and the star are configured such that the star is axially insertable into the yoke with reduced interference and reduced insertion force. The star is axially inserted into the yoke in an unlocked position. When the star is inserted into the yoke, the star is rotatable to a locked position, whereby the star is retained at the yoke via an interference fit.

16 Claims, 15 Drawing Sheets

(51) Int. Cl.
*H02K 15/02* (2006.01)
*H02K 1/14* (2006.01)

(52) U.S. Cl.
CPC ......... *H02K 15/022* (2013.01); *H02K 15/028* (2013.01)

(58) Field of Classification Search
CPC .. H02K 15/022; H02K 15/024; H02K 15/026; H02K 15/028; H02K 15/04; H02K 15/06; H02K 15/14; H02K 1/18
USPC .... 310/216.007, 216.008, 216.009, 216.018, 310/216.125, 216.126; 29/596
See application file for complete search history.

(56) References Cited

U.S. PATENT DOCUMENTS

| | | | |
|---|---|---|---|
| 6,215,261 B1 | 4/2001 | Becerra | |
| 6,965,212 B1 | 11/2005 | Wang et al. | |
| 7,851,966 B2* | 12/2010 | Rippel | H02K 3/34 310/215 |
| 2003/0006664 A1* | 1/2003 | Eggers | H02K 1/04 310/254.1 |
| 2003/0173924 A1* | 9/2003 | Blase | F02M 37/08 318/538 |
| 2004/0104638 A1* | 6/2004 | Yoneda | H02K 1/148 310/216.012 |
| 2004/0105200 A1 | 6/2004 | Ikeda et al. | |
| 2005/0062494 A1 | 3/2005 | Bu et al. | |
| 2006/0066169 A1* | 3/2006 | Daugherty | H02K 1/06 310/216.016 |
| 2008/0224650 A1 | 9/2008 | Ito et al. | |
| 2014/0042937 A1 | 2/2014 | Schmidt | |
| 2015/0028781 A1 | 1/2015 | Steigerwald | |
| 2015/0130382 A1 | 5/2015 | Schussler | |
| 2015/0176596 A1 | 6/2015 | Gossling et al. | |

FOREIGN PATENT DOCUMENTS

| | | | |
|---|---|---|---|
| DE | 102012210532 | 7/2013 | |
| EP | 1466779 | 10/2004 | |
| EP | 2133991 | 6/2011 | |
| JP | 2006067667 | 3/2006 | |
| JP | WO 2014020756 A1 * | 2/2014 | ............ H02K 1/185 |
| JP | WO 2015173932 A1 * | 11/2015 | ............ H02K 1/18 |
| WO | WO2004068693 | 8/2004 | |
| WO | WO2008023779 | 2/2008 | |
| WO | WO2013156571 | 10/2013 | |
| WO | WO2015138672 | 9/2015 | |

OTHER PUBLICATIONS

Takashi Umeda, Rotating Electric Machine Armature Iron Core and Armature Manufacturing Method, Nov. 19, 2015, Mitsubishi Electric, WO 2015173932 (English Machine Translation).*
Salah et al., "PWM Switching Strategy for Torque Ripple Minimization in BLDC Motor," Journal of Electrical Engineering, vol. 62, No. 3, 141-146, 2011.

* cited by examiner

3) Rotor

2) Star

1) Yoke

Copper wire

FIG. 18 Unlock position

FIG. 19 Lock position

△ = Rigid constraint (gage, tool, clamp, etc.)

FIG. 22

Different star/yoke contact area shape

INTERLOCKED STATOR YOKE AND STAR FOR ELECTRIC MOTOR

CROSS REFERENCE TO RELATED APPLICATION

The present application claims the filing benefits of U.S. provisional application, Ser. No. 61/869,195, filed Aug. 23, 2013, which is hereby incorporated herein by reference in its entirety.

FIELD OF THE INVENTION

The present invention relates electrical motors and, more particularly, to stators for electric motors with internal rotors.

BACKGROUND OF THE INVENTION

Typically, a one-component stator is inexpensive and heavily used in standard inner rotor motors, but has limits in the winding process (copper wire diameter, filling factor, inner diameter, and the like) and as a consequence is limited in reaching high efficiency versus cost and package targets.

Two-component stator designs are known. Typically, a two-component stator consists of cutting a ring for a stator yoke and a separate cutting a star which, once separately wound, is then axially pressed into the rotor yoke. Such a stator construction may allow for improved winding with high copper diameter and filling factor but it generates several disadvantages, including (i) high and variable insertion forces required to press the star into the yoke, which makes the process difficult to control, (ii) the necessity to cut the two parts of the stator in different punching stations, in order to have a better dimensional control and for reducing the insertion force issues, which increases the part cost due to process labor and iron scrap, and (iii) iron losses generated by electrical contacts due to interference and not perfect alignment between yoke/star lamination (eddy currents in excess that downgrade the laminations grade).

SUMMARY OF THE INVENTION

The present invention provides a stator construction for an electric motor that has the star and yoke components of a stator (and rotor) as a single lamination, with the components of the lamination being stamped or punched in "one shot". This is possible because of the free space between the three components that allows the stamping operation. The stacking of the three elements is also done in the same stamping tool. The star and yoke are laminated and formed via the same stamping operation and then assembled together after the coils are wound onto the star. The present invention provides for more freedom degrees about the winding operation, with less effort for the star insertion into the yoke, and better lamination alignment, thereby reducing the iron losses and increasing the motor efficiency.

Therefore, the present invention provides a stator for an electric motor with an internal rotor, with the stator winding with high diameter copper wire, and providing (i) a high copper filling factor, (ii) an easier external winding of the stator star, (iii) needle, flyer, inserted coils, (iv) low or reduced iron losses between yoke/stator star contact areas due to perfect alignment, (v) low assembly forces for yoke/stator interlocking, and (vi) yoke, stator star and rotor lamination stamping in one shot, with process cost reduction because less punches hit and scrapped material reduction.

These and other objects, advantages, purposes and features of the present invention will become apparent upon review of the following specification in conjunction with the drawings.

DESCRIPTION OF THE PREFERRED EMBODIMENTS

Figure 1:
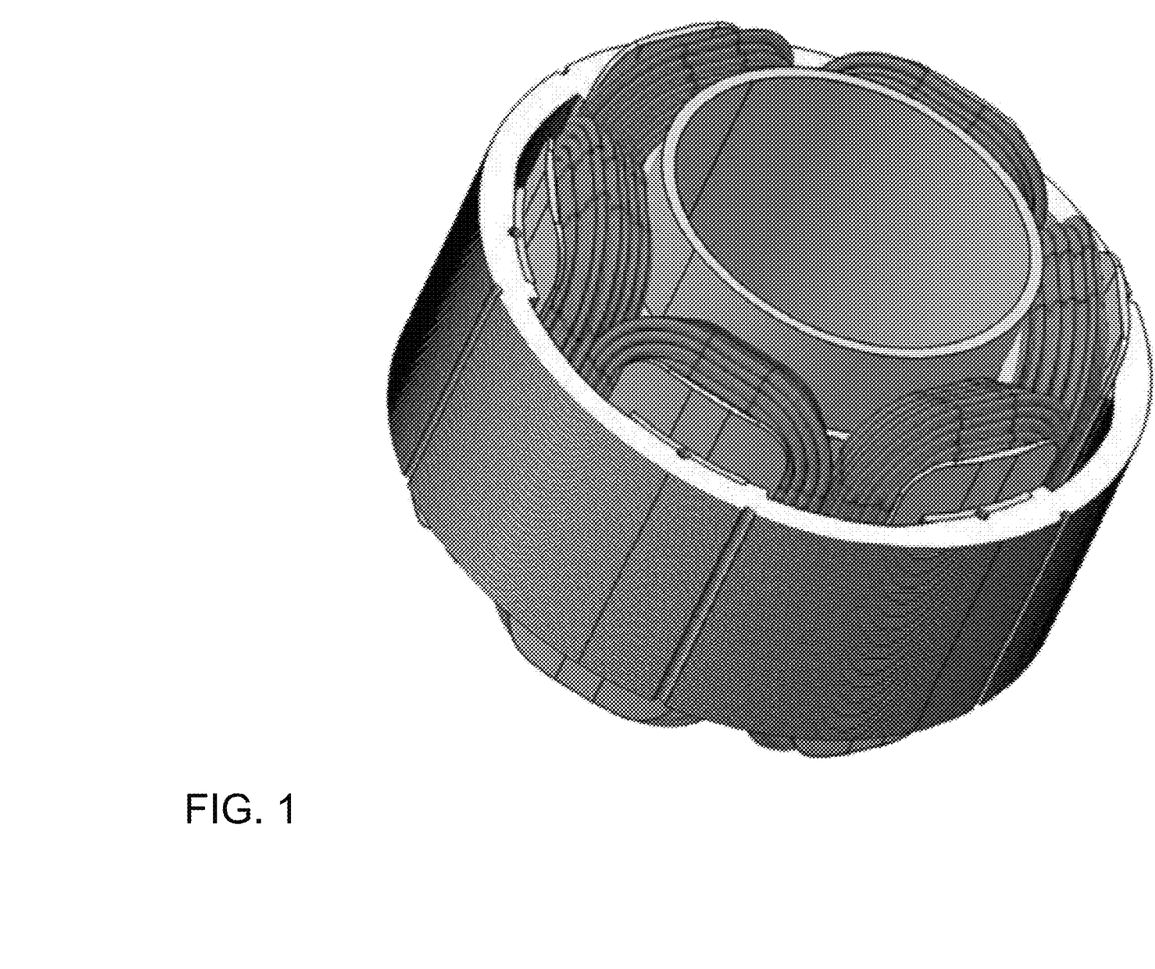
FIG. 1 is a perspective view of a stator construction in accordance with the present invention.
Figure 5:
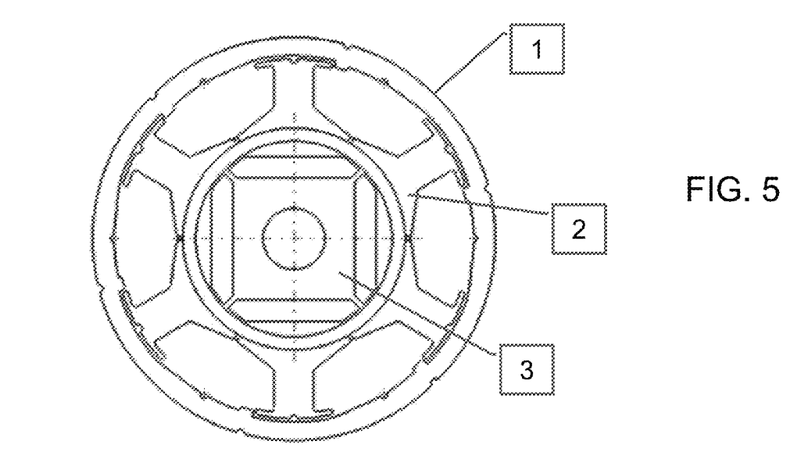
FIG. 5 is a plan view of the yoke, star and rotor assembly of the stator of the present invention.
Figure 6:
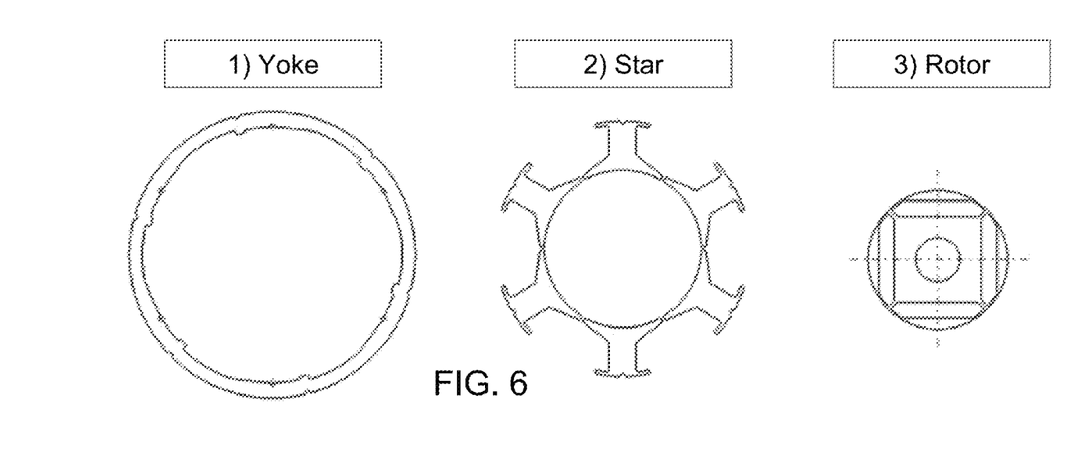
FIG. 6 is an exploded view of the yoke, star and rotor assembly of FIG. 5.

Referring now to the drawings and the illustrative embodiments depicted therein, a stator of the present invention comprises a yoke and a star, which are joined together and which rotate about a rotor (FIGS. 1, 5 and 6). The yoke and star are formed so that the star (which may be laminated and comprise a plurality of layers of star elements) may be readily inserted axially into the yoke (which may be laminated and comprise a plurality of layers of yoke elements) and then rotated relative to the yoke to provide a tight interference fit between the yoke and star. The yoke and star elements (and optionally the rotor too) may be punched via a common punching process so that, when the star and yoke are assembled together, the interference fit between the components is tight and consistent.

The present invention designs the separation surfaces between the stator yoke and the separate teeth of the star so that they can be assembled, after winding of the wire onto the star, with a zero or near zero force needed for the axial movement of the star into the yoke and then with low force rotational locking. Since both the yoke and star are laminated in a plane perpendicular to the axial direction, they produce a strong reaction force in axial direction, while for a movement parallel to the lamination plane the laminations will naturally tend to slide between them thus minimizing the mechanical and electromagnetic problems.

Figure 2:
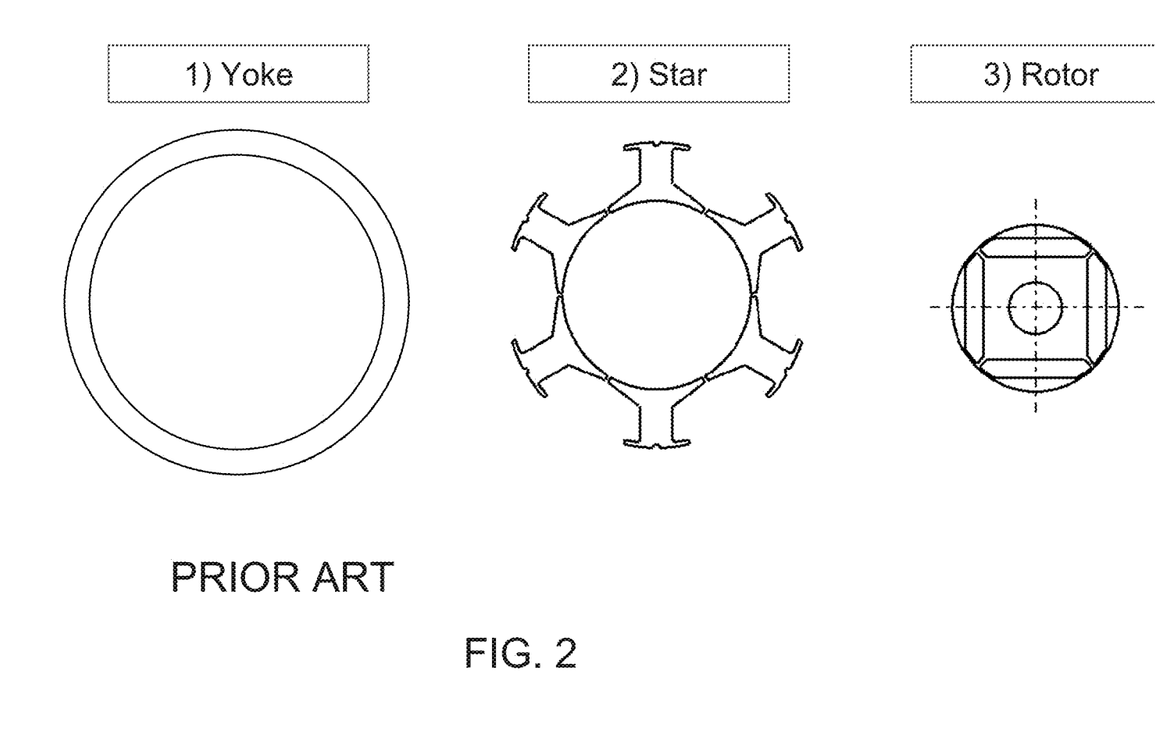
FIG. 2 is an exploded view of a prior art stator construction.
Figures 3, 4:
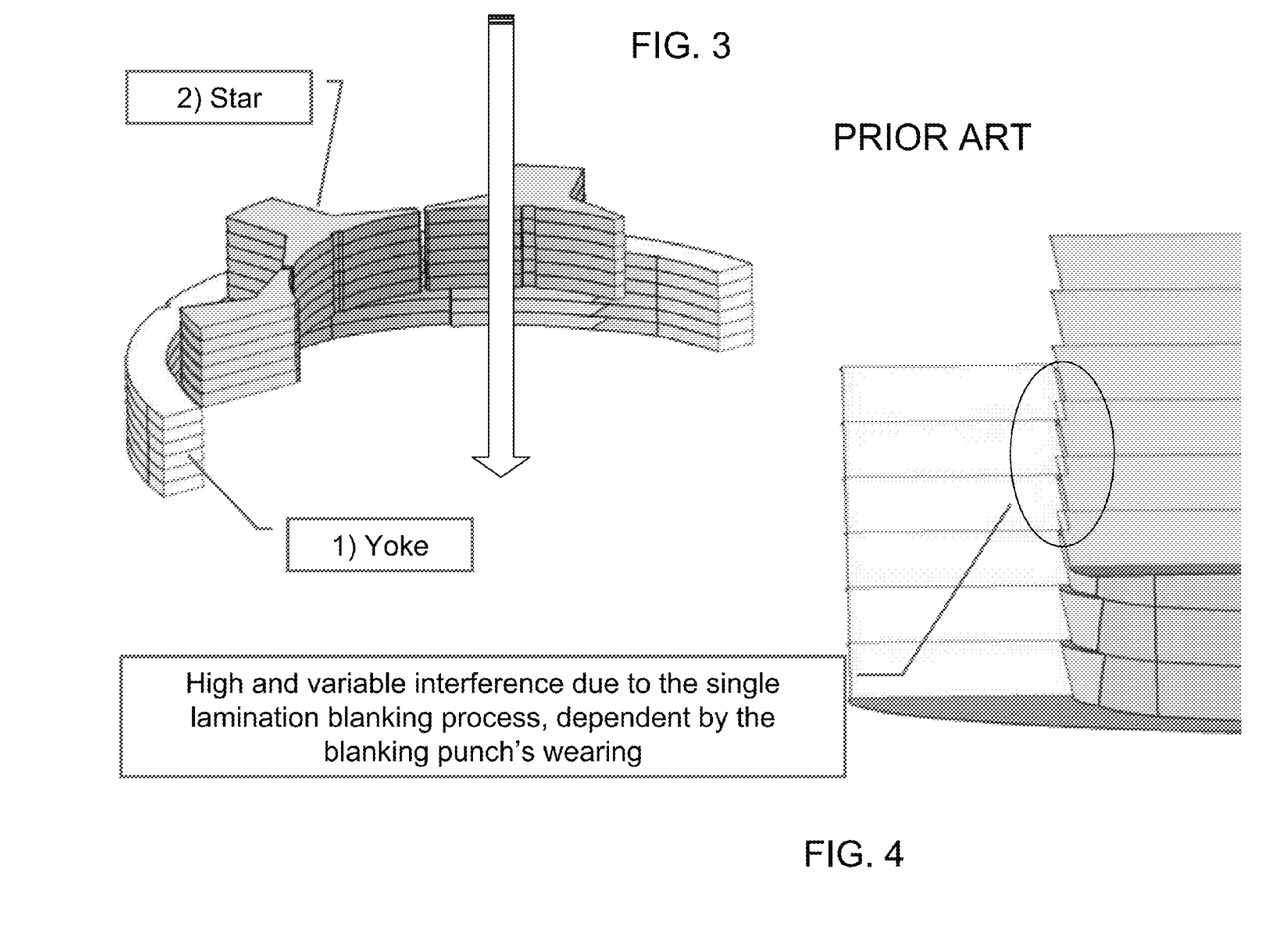
FIGS. 3 and 4 are perspective views of a prior art laminated star and prior art laminated yoke as they are pressed together.

It is known to form a yoke and star for a stator by cutting a ring (having a generally cylindrical inner surface) for stator yoke and a separate stator star, which, once separately wound, is then axially pressed-in into the stator yoke (such as can be seen with reference to FIGS. 2-4. Such a construction may allow the winding with high copper diameter and filling factor but it generates several disadvantages, including a high and variable insertion force (to press the star into the yoke) which makes the process difficult to control. Thus, such a construction also has the two parts of the stator cut in different punching steps, in an attempt to provide better dimensional control and for reducing the insertion force issues. The prior art constructions may also have increased iron losses generation, such as by the electrical contacts due to interference and not perfect alignment between the yoke/star lamination (eddy currents in excess that downgrade the material grade). Also, and as can be seen with reference to FIGS. 3 and 4, the star (after the winding process) is pressed axially into the yoke and this process may encounter high and variable interferences due to the single lamination blanking process, with the interferences being dependent by the wearing of the blanking punches for the respective parts.

The stator (and rotor) components (single lamination) of the present invention include the star and yoke and rotor components of the lamination stamped in "one shot". This is possible because of the free space (see, for example, FIG. 10) between portions of the three components that allows for the single punching or stamping operation. The stacking of the three elements may also be done with the same stamping tool.

Figures 7, 8:
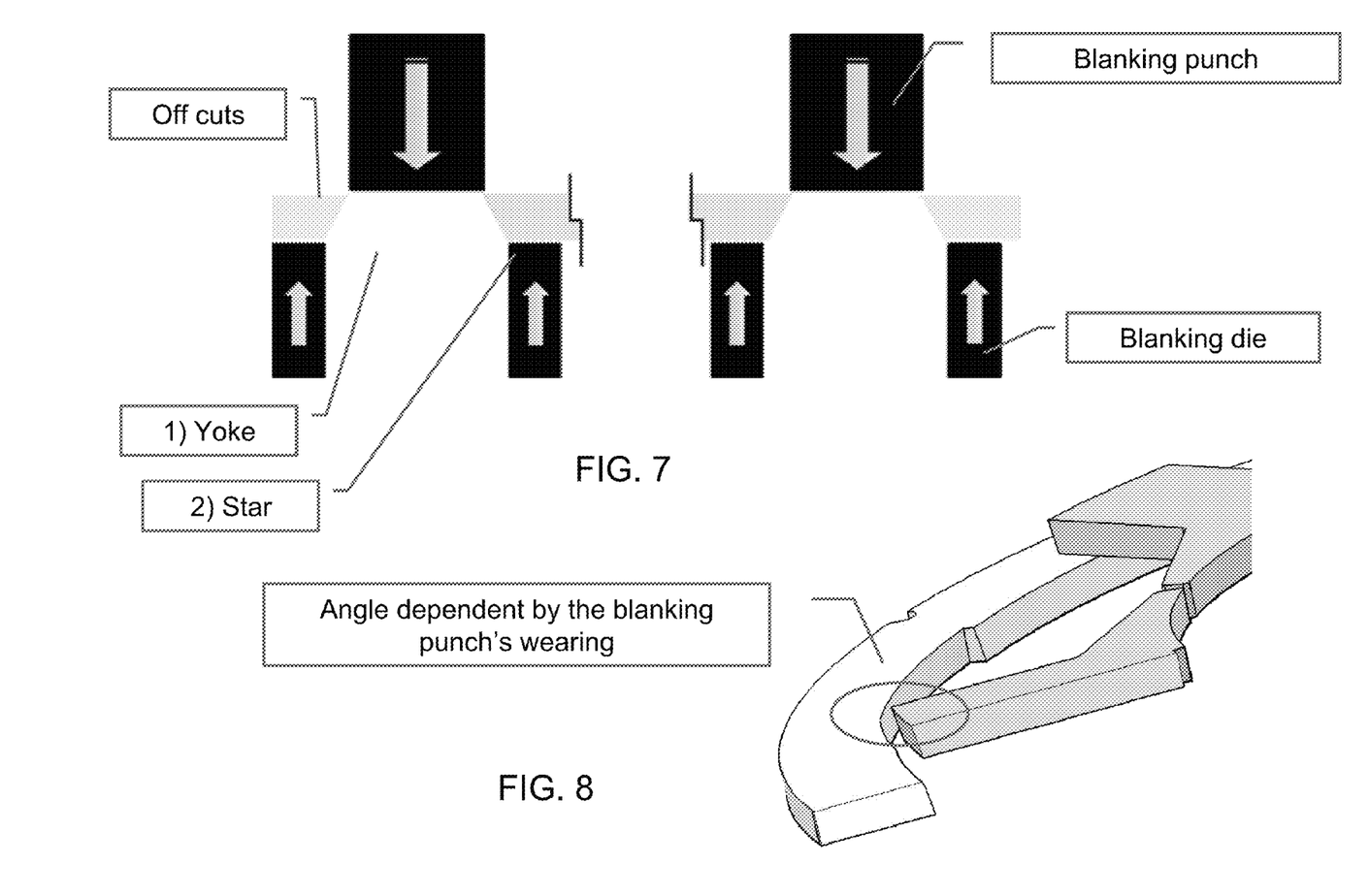
FIG. 7 is a schematic of the punching operation that forms the yoke and star of the stator of the present invention.
FIG. 8 is a perspective view of a portion of the punched yoke and star formed from the punching operation of FIG. 7.

As can be seen with reference to FIGS. 7 and 8, the process causes a distortion of the lamination's edges. The distortion may vary and grow with the unavoidable blanking punch wearing. By punching or stamping the parts together (via a single punching operation) the variations that may occur due to wear of the punch occur to all of the punched parts (the star and the yoke and optionally the rotor) such that the effects of the wearing are reduced or minimized.

Figures 9, 10:
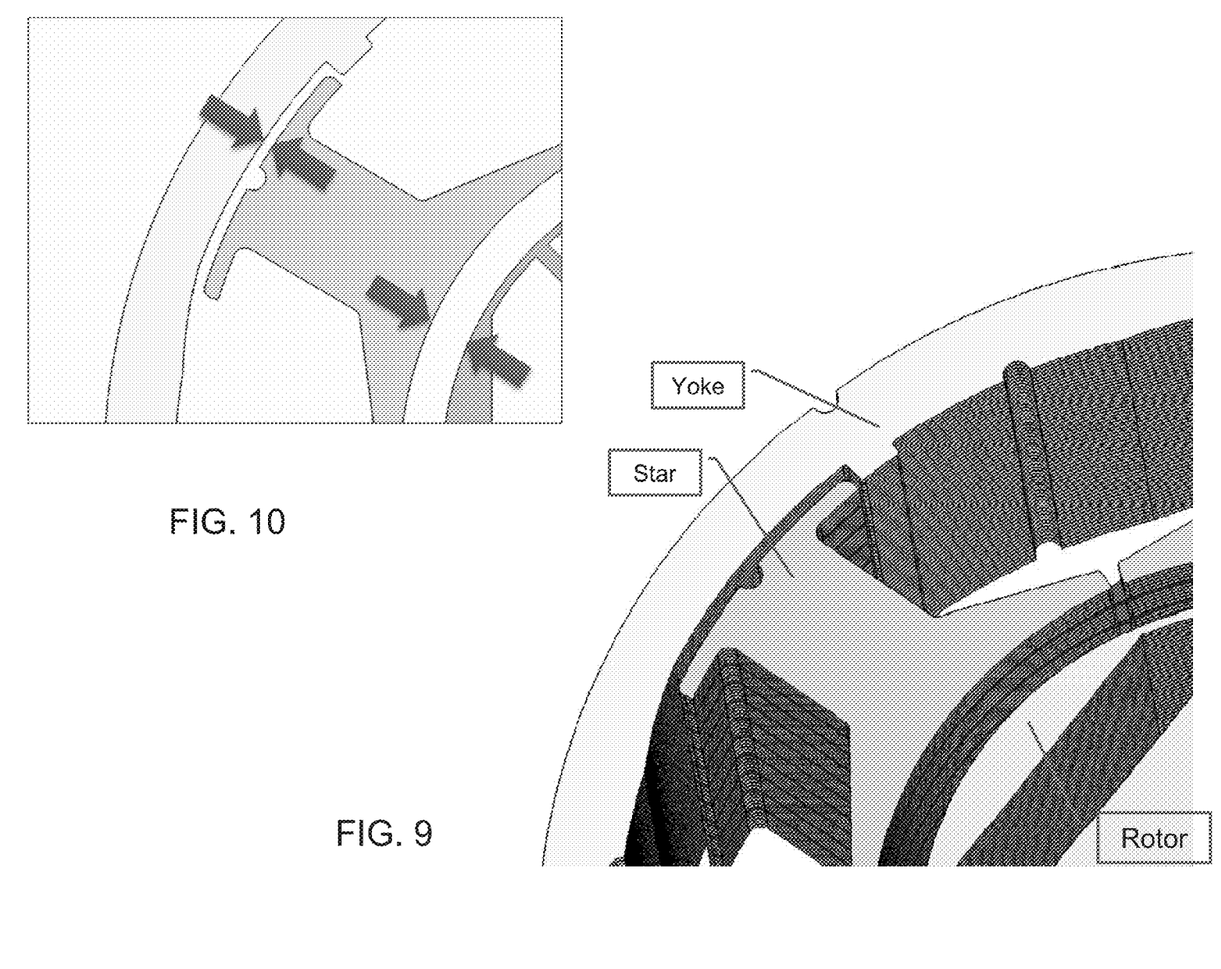
FIG. 9 is a perspective view of the star and yoke of the stator of the present invention, shown when the star is inserted into the yoke at a portion of the yoke that has a larger inner radius to provide clearance for the star therein.
FIG. 10 is a schematic of the assembly of FIG. 9, showing the clearance between the star and yoke.

As shown in FIG. 9, the stator (and rotor) components are stacked laminations. Optionally, a spacer (FIGS. 9 and 11) lamination may be included between some of the adjacent layers of the star. As shown in FIG. 10, there is a clearance dimension between the star and the yoke (before they are interlocked as discussed below) and there is a clearance dimension between the star and the rotor, with the spacings providing a minimum distance for blanking.

Figures 11, 12, 13:
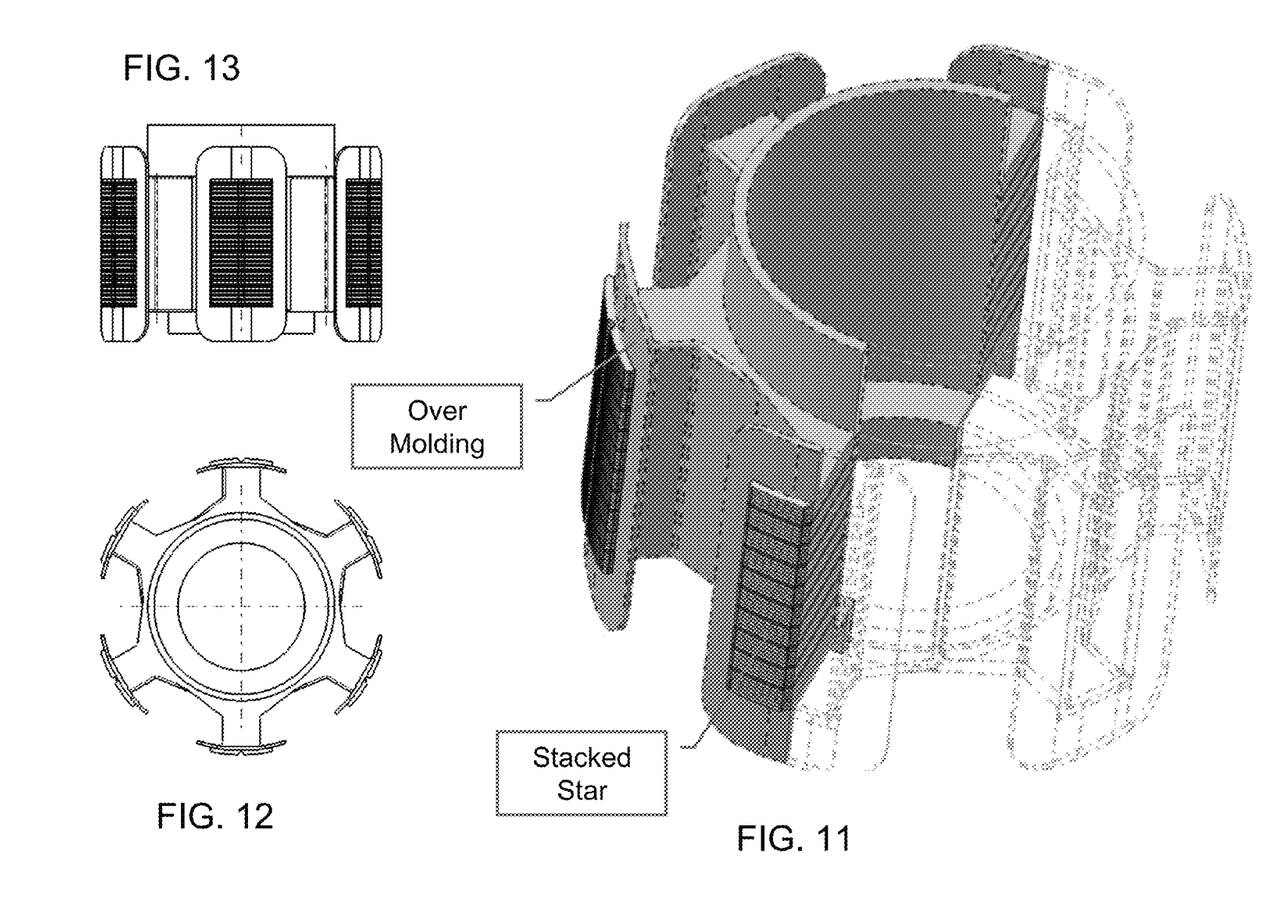
FIG. 11 is a perspective and partial sectional view of the stacked or laminated star, with an over molding disposed thereat.
FIG. 12 is a plan view of the star of FIG. 11.
FIG. 13 is a side elevation of the star of FIG. 11.
Figure 14:
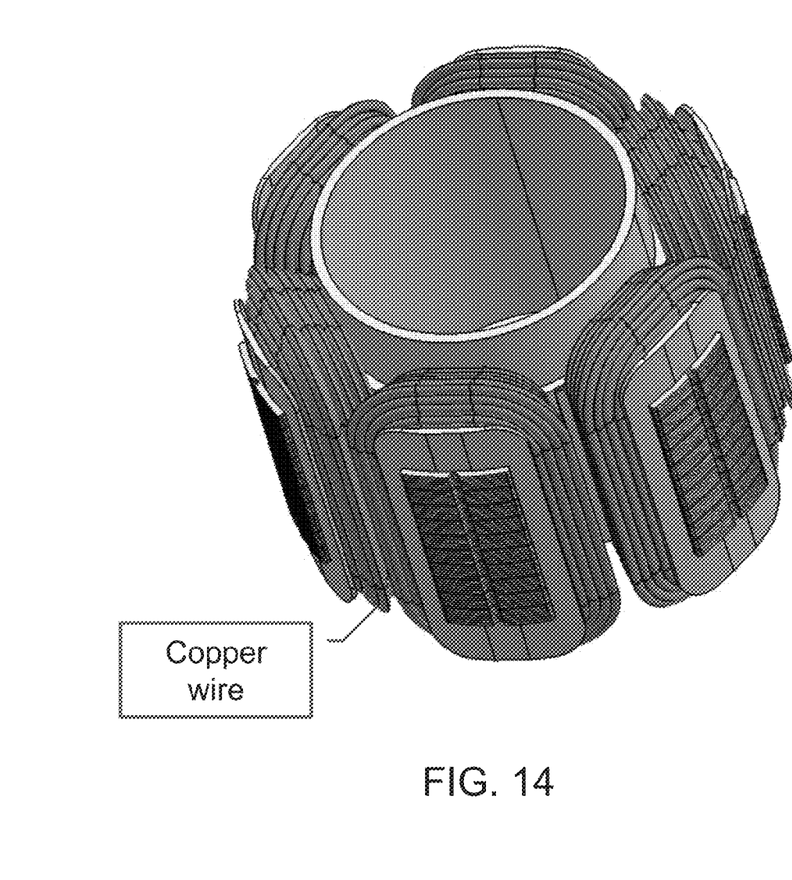
FIG. 14 is a perspective view of the star of FIG. 11, shown with copper wire wound thereat.
Figure 15:
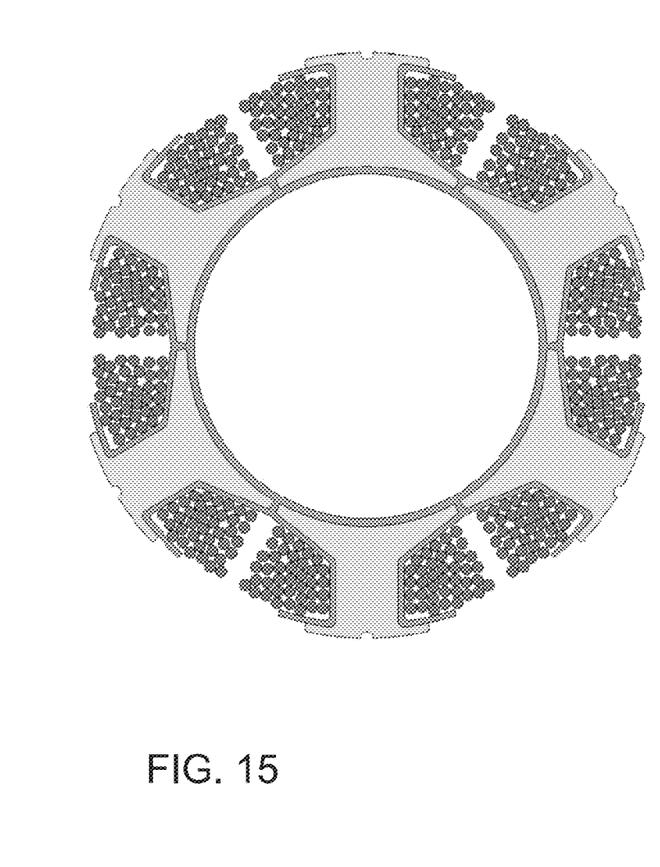
FIG. 15 is a sectional view of the star of FIG. 14.

As shown in FIGS. 11-13, the stator star, once stacked and laminated, may be insulated, such as by a plastic overmolding or by two or more plastic shells or the like. The next operation, such as shown in FIGS. 14 and 15, in the process workflow is the winding of the copper wire around the respective teeth of the star. Different winding technologies can be used to achieve the highest filling factor required or desired by the particular stator or motor application, thereby enhancing or optimizing the motor dimensions and costs vs. features tradeoffs. As can be seen with reference to FIG. 15, the stator of the present invention may have a high or greater or enhanced copper filling factor due to the outer winding operation.

Figures 16, 17:
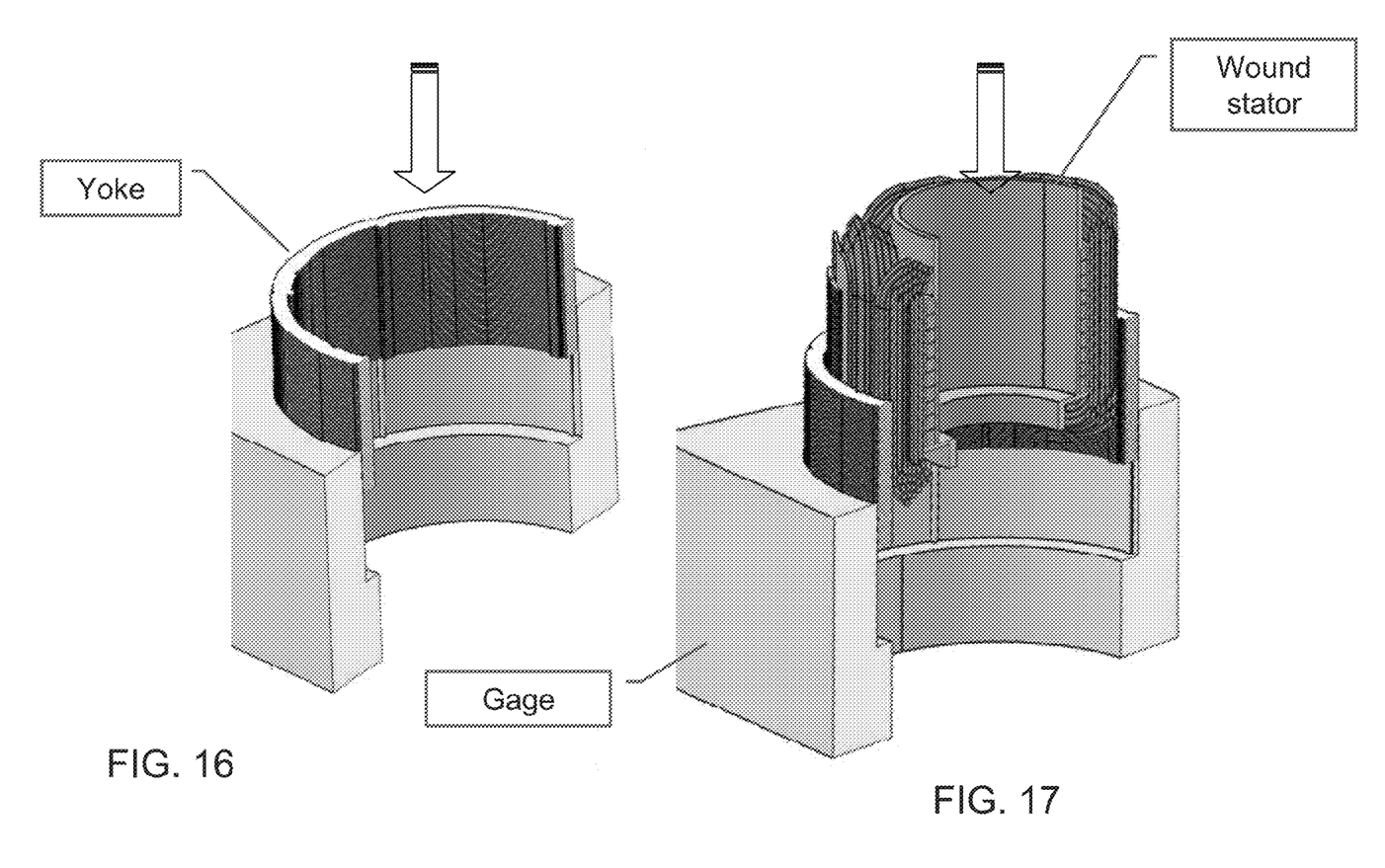
FIGS. 16-31 are views of the assembly processes and stator assembly of the present invention.
Figures 18, 19:
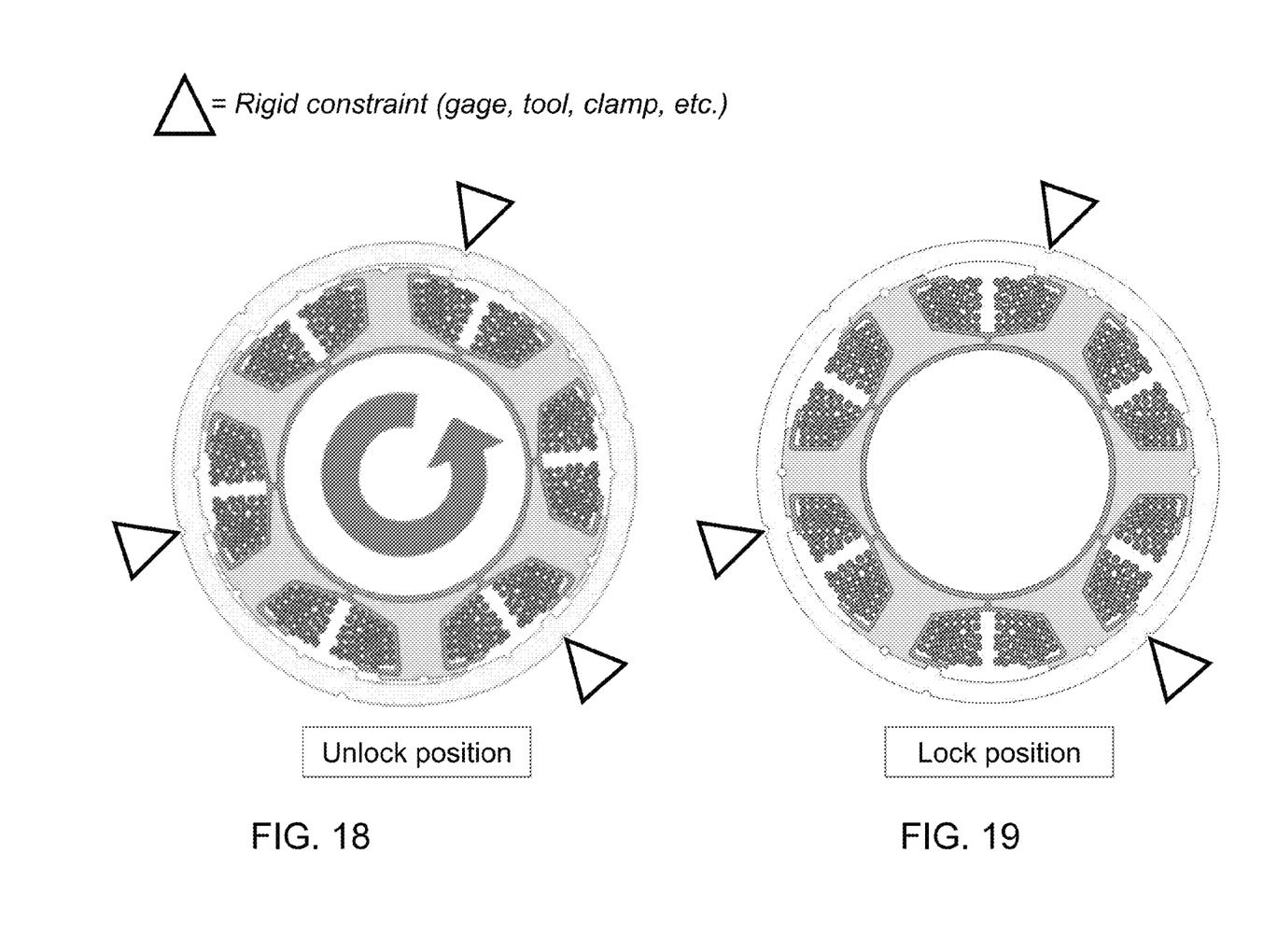

To assemble the stator assembly, and with reference to FIGS. 16-30, the yoke may be inserted into a gage (FIGS. 16 and 17), and then the wound star is inserted axially into the yoke in the "unlock position". The unlock position (FIGS. 18 and 20) is when the star is inserted such that its teeth or arms are positioned at portions of the yoke where the inner surface of the yoke has a greater radius to provide additional clearance between the star and the yoke. Thus, the star may be inserted axially into the yoke with little or no axial force required.

After the star is inserted into or received in the yoke, the wound star is rotated (such as via a specific tool) relative to the yoke to a "lock position" (FIGS. 19 and 21), where the teeth of the star are moved relative to the yoke to a position at ports of the yoke where the inner surface of the yoke has a reduced or smaller radius to provide no clearance between the star and the yoke and thus to provide an interference between the star and the yoke.

Figure 20:
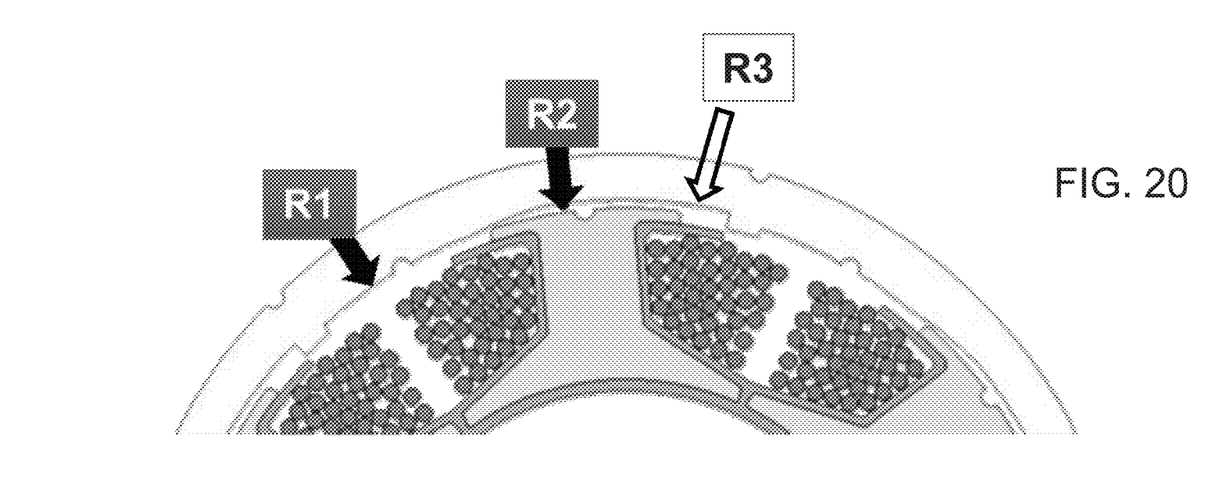
Figure 21:
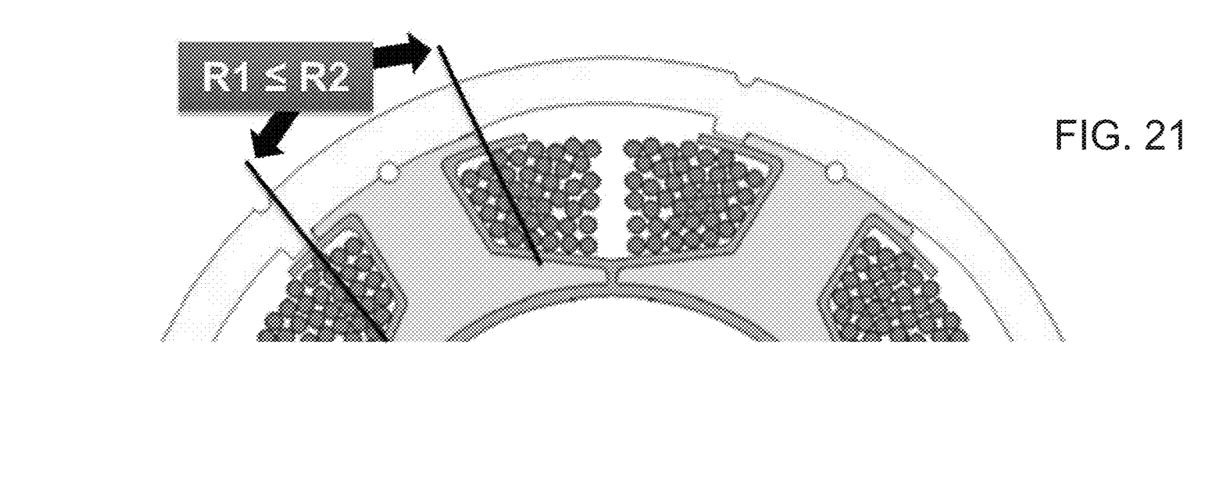

As best seen with reference to FIGS. 20 and 21, the inner surface of the yoke is formed with different radii, such as a smaller radius portion R1 and a larger radius portion R3, while the outer surface of the star as radius R3. R1 and R2 are concentric and R1 is less than or equal to R2 to ensure the interference between yoke and star stack when in the lock position. The star radius R3 is concentric to R1 and R2, and R3 is greater than R2 to ensure the blanking and to provide the low or zero axial insertion force when in the unlock position. R3 is connected to R1 by a profile designed to facilitate the sliding between yoke and star during the rotation from the unlock position to the lock position.

Figure 22:
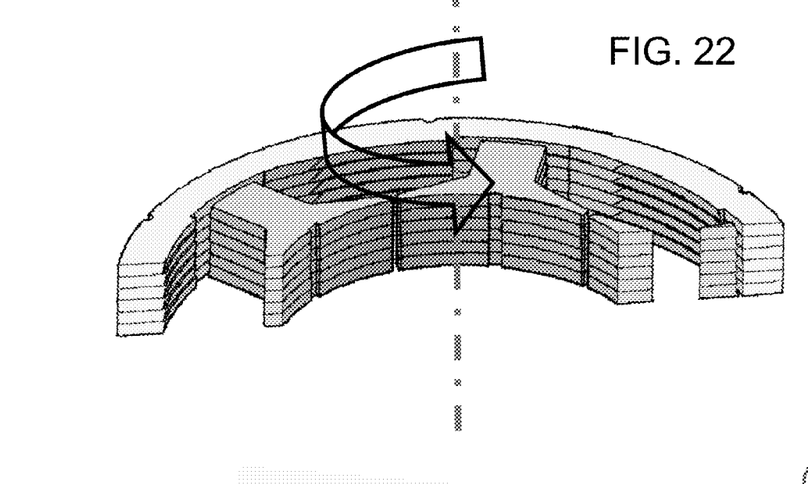
Figure 23:
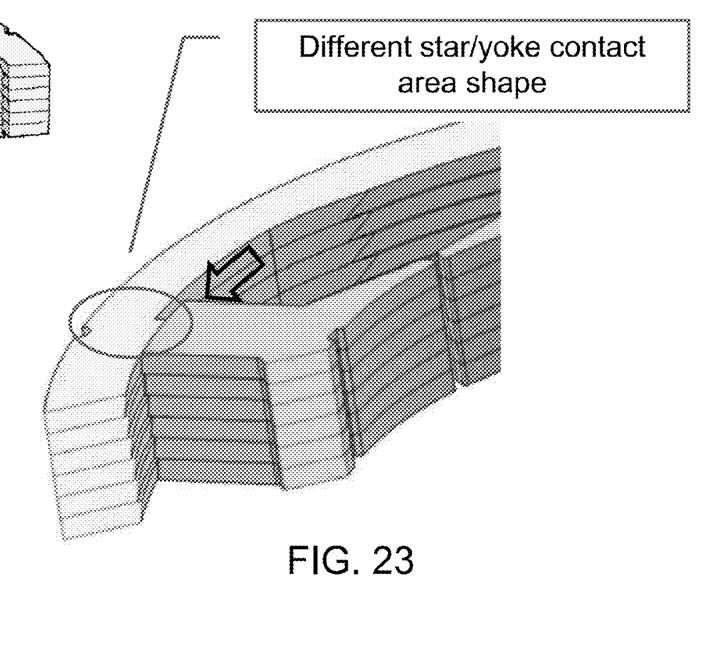
Figure 24:
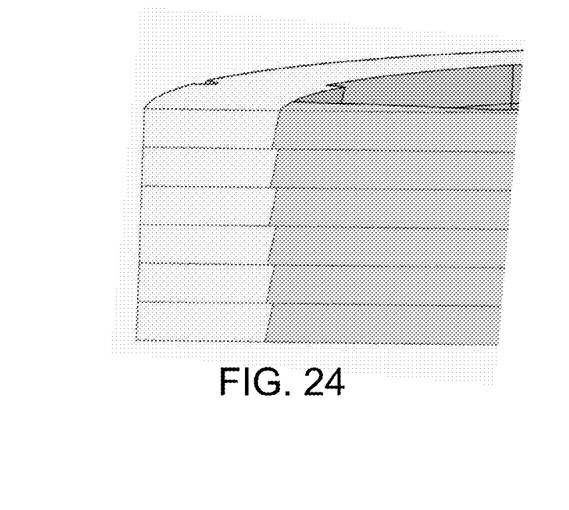
Figure 25:
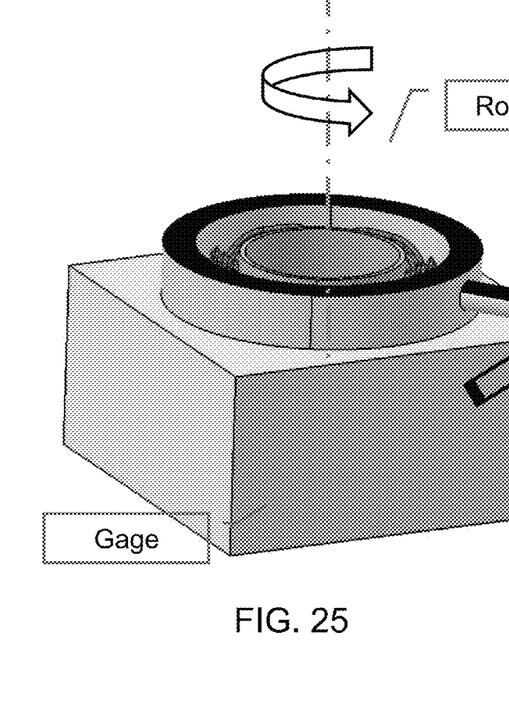
Figure 26:
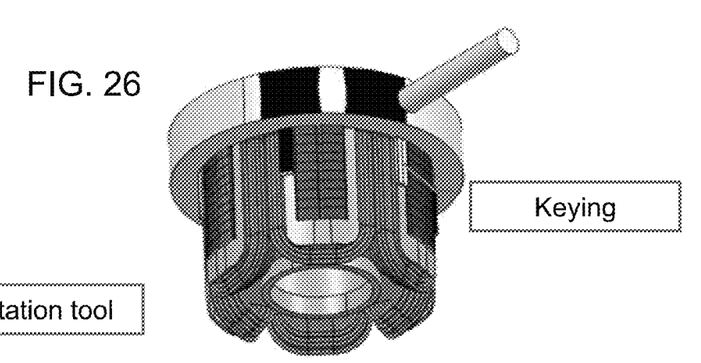
Figure 27:
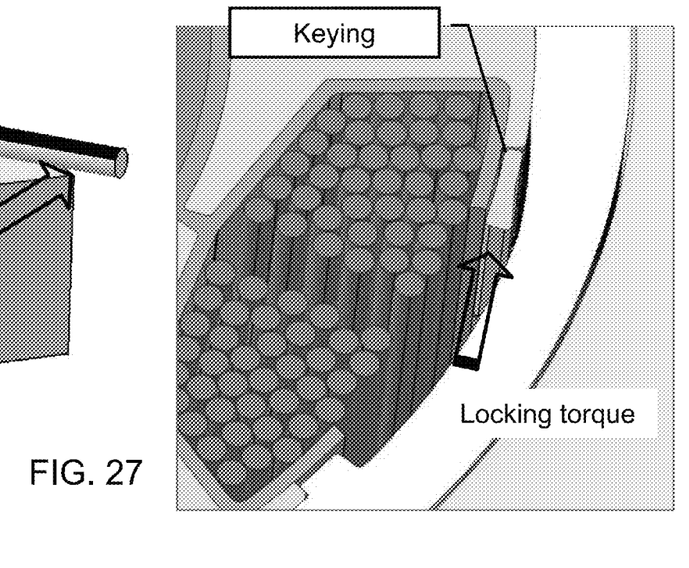

The present invention thus provides an assembly process or concept where the star is inserted into the yoke and rotated to achieve the final assembly position. Optionally, and as shown in FIGS. 22-24, the star/yoke contact area's shape may be different than discussed above.

Figure 28:
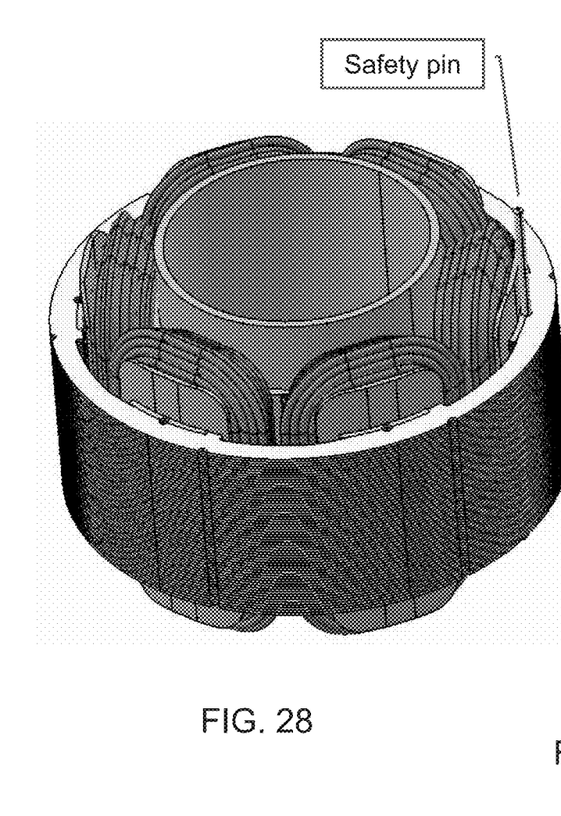
Figure 29:
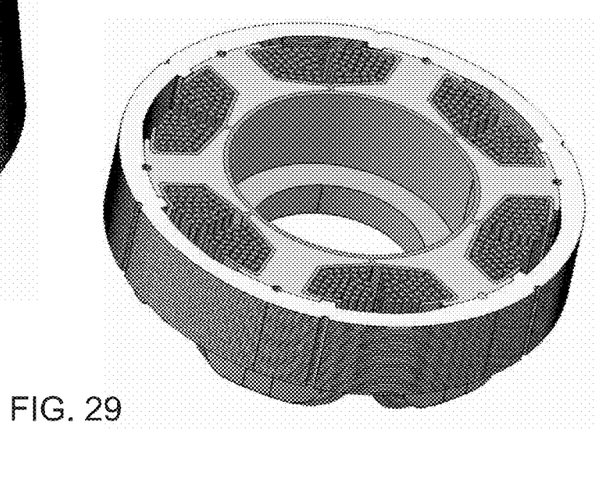
Figure 30:
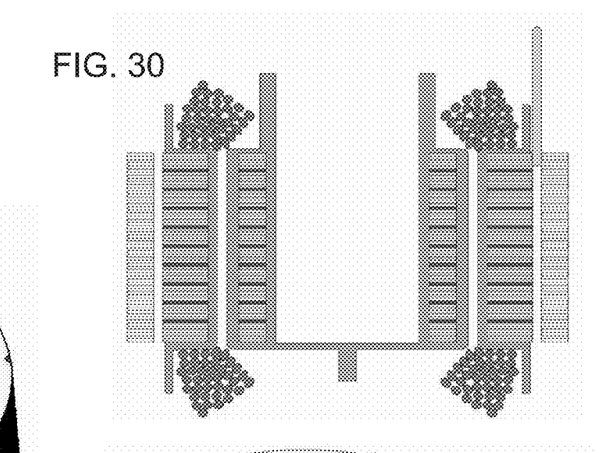

Thus, and as can be seen with reference to FIGS. 25-30, the yoke is inserted into the gage and the star (with coils and overmolding disposed thereat) is inserted into the yoke with the star ends aligned with or positioned at the larger radius portions of the yoke. A rotation tool is then positioned at the star and yoke and gage to engage portions of the star and to rotate the star from the unlocked position to the locked position. For example, the tool may include one or more keys or elements (FIGS. 26 and 27) that are inserted into the yoke and at the larger radius portion of the yoke to engage the star portion disposed thereat. Rotation of the tool thus imparts a force at the star portions and a torque at the star to rotate the star to the locked position. When in the locked position (such as shown in FIGS. 28-30), a locking pin or safety pin may be inserted between the star portions and the yoke (such as in a passageway formed by corresponding recesses at the inner surface of the yoke and the outer surface of the star when the recesses are aligned when the star is moved to the lock position).

Figure 31:
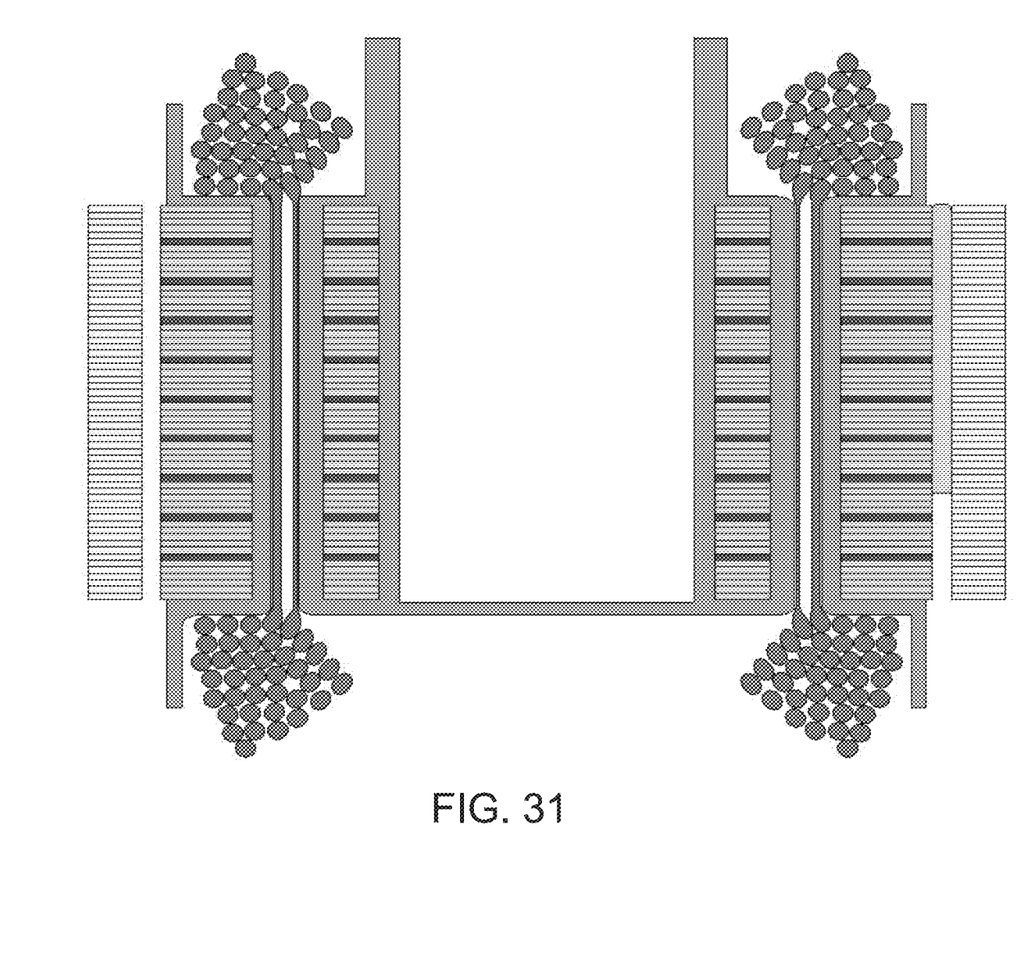

FIG. 31 shows the lamination alignment of the stator assembly. The rotation movement (tangential) avoids the stresses on the yoke and the star that may otherwise be typical of the traditional forced insertion techniques (axial), thus providing for enhanced lamination alignment and reducing the iron losses and increasing, as a consequence, the motor efficiency.

Changes and modifications in the specifically described embodiments can be carried out without departing from the principles of the invention, which is intended to be limited only by the scope of the appended claims, as interpreted according to the principles of patent law including the doctrine of equivalents.

What is claimed is:

1. A stator for an electric motor, said stator comprising:
a yoke;
a star disposed in said yoke, wherein said star comprises a plurality of arms;

wherein said star receives a rotor therein;
wherein said star has at least one wire coiled around a portion of each arm of said plurality of arms of said star;
wherein each said arm of said star comprises a respective outer engaging portion, with each outer engaging portion comprising an outer leading edge that extends laterally from said respective outer engaging portion, and wherein each outer engaging portion further comprises a first indentation;
wherein said yoke comprises a plurality of ports at an inner surface of said yoke, and wherein each port of said plurality of ports comprises a sidewall, and wherein each port of said plurality of ports further comprises a second indentation;
wherein said yoke and said star are configured such that said star, is rotatable in said yoke between an unlocked position and a locked position;
wherein, when said star is in said unlocked position with respect to said yoke, said star is rotatable relative to said yoke to said locked position, and wherein said locked position comprises said star retained at said yoke via an interference fit, such that said outer leading edges of respective outer engaging portions of said star contact corresponding sidewalls of said ports of said yoke, and further such that said first indentations of said outer engaging portions align with a respective second indentation of a respective port.

2. The stator of claim 1, wherein said inner surface of said yoke has larger radius portions and smaller radius portions, and wherein said outer engaging portions of said star are disposed at said larger radius portions when in the unlocked position and at said smaller radius portions when in the locked position, and wherein said outer engaging portions of said star face said inner surface of said yoke.

3. The stator of claim 1, wherein said star and said stator comprise laminated components.

4. The stator of claim 3, wherein said star and said stator each comprise corresponding laminations in a plane perpendicular to the axial direction.

5. The stator of claim 1, wherein said star, when in said unlocked position, has a first amount of interference with said yoke, and wherein said star, when in said locked position, has a second amount of interference with said yoke, and wherein said second amount of interference is greater than the first amount of interference.

6. The stator of claim 1 further comprising a locking pin disposed between an aligned pair of corresponding first and second indentations.

7. A method for assembling a stator for an electric motor, wherein said method comprises:
providing a star configured to receive a rotor therein, wherein said star comprises a plurality of arms;
providing a yoke configured to receive said star;
coiling at least one wire around a portion of each arm of said plurality of arms of said star;
wherein each said arm of said star comprises a respective outer engaging portion, with each outer engaging portion comprising an outer leading edge that extends laterally from said respective outer engaging portion, and wherein each outer engaging portion further comprises a first indentation;
wherein said yoke comprises a plurality of ports at an inner surface of said yoke, and wherein each port of said plurality of ports comprises a sidewall, and wherein each said port of said plurality of ports further comprises a second indentation;
axially inserting said star into said yoke in an unlocked position with respect to said yoke, wherein, when said star is axially inserted into said yoke in said unlocked position, said star is axially inserted into said yoke with reduced interference and reduced insertion force as compared to axially inserting said star into said yoke in a locked position; and
rotating said star relative to said yoke to rotate said star to said locked position, wherein, when said star is in said locked position, said star is retained at said yoke via an interference fit, wherein said rotating said star to said locked position comprises rotating said star until said outer leading edges of respective outer engaging portions of said star contact corresponding sidewalls of said ports of said yoke, such that said first indentations of said outer engaging portions align with said second indentations of respective ports.

8. The method of claim 7, wherein said inner surface of said yoke has larger radius portions and smaller radius portions, and wherein said outer engaging portions of said star are disposed at said larger radius portions when said star is in the unlocked position and at said smaller radius portions when said star is in the locked position, and wherein said outer engaging portions of said star face said inner surface of said yoke.

9. The method of claim 7 further comprising inserting a locking pin between said yoke and said star to further retain said star in said locked position relative to said yoke, wherein said inserting a locking pin between said yoke and said star comprises inserting said locking pin in aligned first and second indentations.

10. The method of claim 7, wherein, after winding the coils at said star, said star is insertable into said yoke with a reduced force axial movement.

11. The method of claim 7, wherein said star and said stator comprise laminated components.

12. The method of claim 11, wherein said star and said stator are laminated in a plane perpendicular to the axial direction.

13. The method of claim 7, wherein said yoke and said star are formed via a single common stamping.

14. The method of claim 13, wherein said rotor is formed via the single common stamping.

15. The method of claim 7, wherein said star, when in said unlocked position, has a first amount of interference with said yoke, and wherein said star, when in said locked position, has a second amount of interference with said yoke, and wherein said second amount of interference is greater than the first amount of interference.

16. The method of claim 7, wherein rotating said star relative to said yoke comprises fixing a rotational position of said yoke.

* * * * *

UNITED STATES PATENT AND TRADEMARK OFFICE
CERTIFICATE OF CORRECTION

PATENT NO. : 9,712,002 B2  Page 1 of 1
APPLICATION NO. : 14/466099
DATED : July 18, 2017
INVENTOR(S) : Arnoldi et al.

It is certified that error appears in the above-identified patent and that said Letters Patent is hereby corrected as shown below:

Column 6 Line 44, "claim 11" should be --claim 8--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*